United States Patent [19]
Hara

[11] Patent Number: 5,676,616
[45] Date of Patent: Oct. 14, 1997

[54] PROTECTIVE COVER FOR A BICYCLE DERAILLEUR

[75] Inventor: Nobukatsu Hara, Sakai, Japan

[73] Assignee: Shimano, Inc., Osaka, Japan

[21] Appl. No.: 611,716

[22] Filed: Mar. 6, 1996

[51] Int. Cl.[6] .................................................. B23J 13/02
[52] U.S. Cl. ..................................................... 474/144
[58] Field of Search ...................................... 474/113, 116, 474/126, 127, 78–80, 144, 92

[56] References Cited

U.S. PATENT DOCUMENTS

| | | | |
|---|---|---|---|
| 3,910,136 | 10/1975 | Juy | 474/82 X |
| 4,586,913 | 5/1986 | Nagano | 474/80 |
| 4,632,416 | 12/1986 | Zelenetz | 474/146 X |
| 4,854,924 | 8/1989 | Nagano | 474/140 |
| 5,018,564 | 5/1991 | Anglin et al. | 474/146 X |
| 5,061,224 | 10/1991 | Stuhler | 474/84 |
| 5,540,118 | 7/1996 | Calendrille | 474/144 X |

FOREIGN PATENT DOCUMENTS

| | | |
|---|---|---|
| 0 439 155 A1 | 7/1991 | European Pat. Off. . |
| 2621968 | 4/1989 | France . |
| 2639015 | 5/1990 | France . |
| WO 92/17365 | 10/1992 | WIPO . |

OTHER PUBLICATIONS

"Grunge Guard Derailleur Boot," published prior to Mar. 6, 1996.

Primary Examiner—Roger J. Schoeppel
Attorney, Agent, or Firm—James A. Deland

[57] ABSTRACT

A protective cover for a derailleur includes a top cover member for covering a top portion of a derailleur, a front cover member coupled to the top cover member for covering a front portion of the derailleur, and a rear cover member coupled to the top cover member for covering a rear portion of the derailleur. In a specific embodiment the top cover member, the front cover member, and the rear cover member define an open lateral outer side. A collar is provided for fitting the protective cover to a structural member of the bicycle.

20 Claims, 2 Drawing Sheets

5,676,616

PROTECTIVE COVER FOR A BICYCLE DERAILLEUR

BACKGROUND OF THE INVENTION

The present invention is directed to protective covers for bicycle components and, more specifically, to a protective cover for a bicycle derailleur.

When bicycles are ridden in wet weather, the tires tend to splash water and mud on the bicycle. This is especially true when a mountain bicycle is ridden on dirt trails, wherein the volume of mud projected from the from and rear wheels can be substantial. Not surprisingly, splashing mud and water on the bicycle can cause many problems for mechanical devices affixed to the bicycle. This is especially true when mud and water are splashed on the bicycle derailleurs, for then the added friction not only makes the derailleur more difficult to operate but causes excessive wear on the components. If such mud and water is splashed on the derailleur in cold weather, then there is also the added risk that ice will form, thus potentially freezing the mechanical components together and preventing operation of the derailleur entirely.

A known protective cover for a derailleur attaches to a seat tube and is constructed so that the moving components of the derailleur are completely covered. Unfortunately, there are many different shapes and sizes of derailleurs, so separate covers must be made for different derailleurs. Furthermore, such covers are expensive to manufacture because they require a substantial amount of material to completely cover the moving components, and the cover must be specially shaped.

SUMMARY OF THE INVENTION

The present invention is directed to a protective cover for a derailleur which is simple in construction yet provides sufficient protection for the derailleur without the disadvantages of known derailleur covers. Since the applicant realizes that most contaminants come from the front, top, or rear of the derailleur, a simple yet effective derailleur cover may be constructed to focus on protection of these critical areas.

In one embodiment of the present invention, a protective cover for a derailleur includes a top cover member for covering a top portion of a derailleur, a front cover member coupled to the top cover member for covering a front portion of the derailleur, and a rear cover member coupled to the top cover member for covering a rear portion of the derailleur. In a specific embodiment the top cover member, the front cover member, and the rear cover member define an open lateral outer side. A collar is provided for fitting the protective cover to a structural member of the bicycle. With this structure, the derailleur is protected from the primary source of contaminants, and the derailleur can move freely without contacting the cover.

In a more specific embodiment, the top cover member, the front cover member, and the rear cover member are each formed as a generally planar member, wherein the front and rear cover members extend downward and are generally perpendicular to the top cover, and the rear cover member extends generally perpendicular to the top cover member. One or more of the cover members also may define an opening which generally aligns with a derailleur adjustment mechanism when the protective cover is mounted to the bicycle.

To allow the protective cover to be used with different types of bicycles, the collar is formed as an arcuate member having first and second free ends. A buckle member fixed to the first and second free ends may be used for attaching the collar to the structural member. The buckle member may be attached directly to the first and second free ends of the collar, or else the buckle member may be formed as a loop which completely encircles the collar and the structural member of the bicycle.

DETAILED DESCRIPTION OF THE EMBODIMENTS

Figure 1:
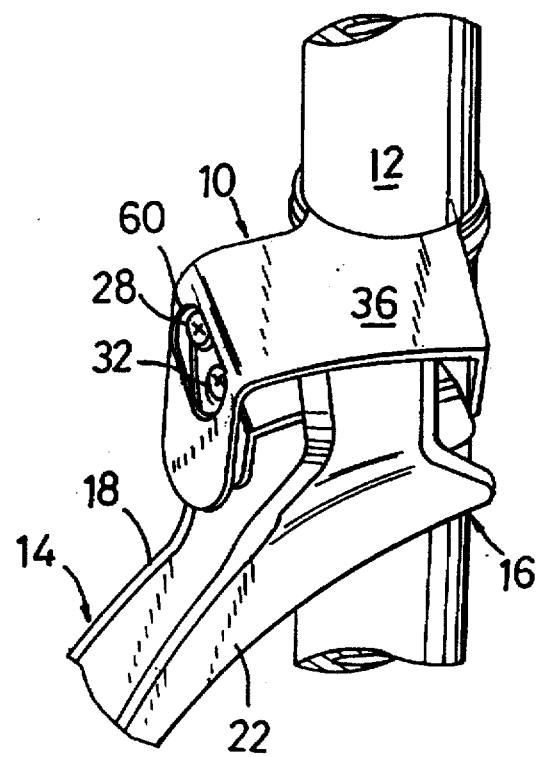
FIG. 1 is a perspective view of a particular embodiment of a protective cover according to the present invention affixed to a bicycle.

FIG. 1 is a perspective view of a particular embodiment of a protective cover 10 according to the present invention affixed to a seat tube (12) of a bicycle above a front derailleur 14. Front derailleur 14 is a conventional front derailleur having a chain guide 16 with an inner chain guide plate 18 and an outer chain guide plate 22. Chain guide 16 is connected to a link mechanism 24 which causes the chain guide 16 to move laterally inwardly and outwardly in response to movement of a derailleur cable (not shown). A well known adjustment mechanism comprising adjustment screws 28,32 are provided on the link mechanism (24) for adjusting the lateral range of motion of chain guide 16.

Link mechanism 24 may take many forms. For example, link mechanism 24 may be of the type where the clamping member which attaches the derailleur to the bicycle is located adjacent to the chain guide, or it may be of the type where the clamping member is located above the chain guide. The derailleur cable may operate the link mechanism from the top or bottom. These and other types of link mechanisms are well known, so a detailed description of them will be omitted.

Figure 2:
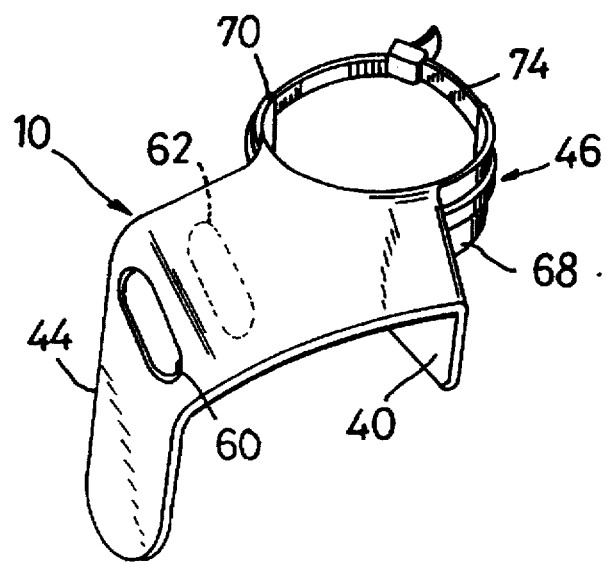
FIG. 2 is a perspective view of the protective cover shown in FIG. 1.
Figure 3:
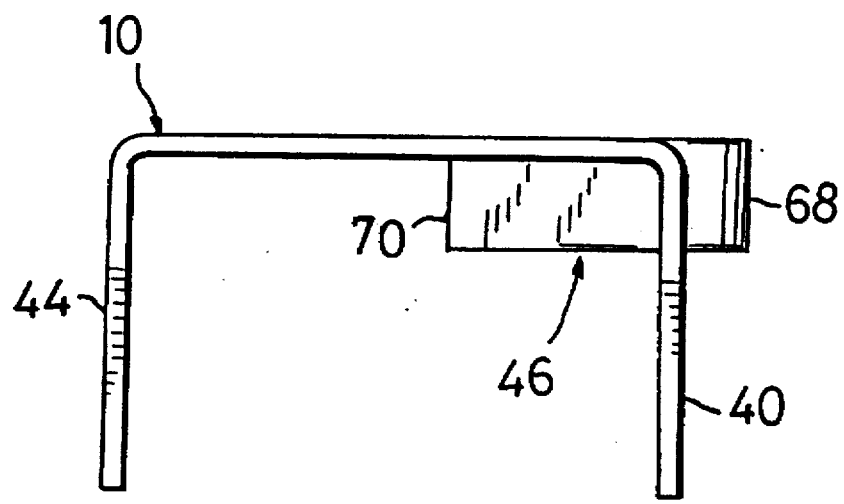
FIG. 3 is a side view of the protective cover shown in FIG. 2.

As shown in FIGS. 1–3, protective cover 10 in this embodiment comprises a top cover member 36, a front cover member 40, a rear cover member 44, and a collar 46 adapted to fit on seat tube 12. Top cover member 36, front cover member 40, and rear cover member 44 are each formed as generally planar members from an elastic resin for decreased weight and added safety, and they are formed as one piece to facilitate manufacturing. Also, in this embodiment, top cover member 36 is disposed generally horizontally when protective cover 10 is attached to the bicycle, and front cover member 40 and rear cover member 44 extend downward and generally perpendicular to top cover 36. Top cover member 36, front cover member 40, and rear cover member 44 define an open lateral outer side and an open lateral inner side in order to save material and simplify construction while still providing sufficient protection for link mechanism 24. As used herein, the terms "top," "bottom," "front," "rear," "inner," and "outer" are to be determined by referring to FIG. 1 where the inner side of the protective cover faces seat tube 12, and the front of the cover faces to the right of the drawing.

To facilitate adjustment of the derailleur, an opening 60 which generally aligns with screws 28,32 may be formed in protective cover 10. In this embodiment, opening 60 is formed in rear cover member 44, but alternatively the opening may be formed wherever the adjustment mechanism is located. For example, an opening 62 may be formed on top cover portion 36 as shown in FIG. 2. A similar opening could be formed on front cover member 40 in the same manner.

Figure 4:
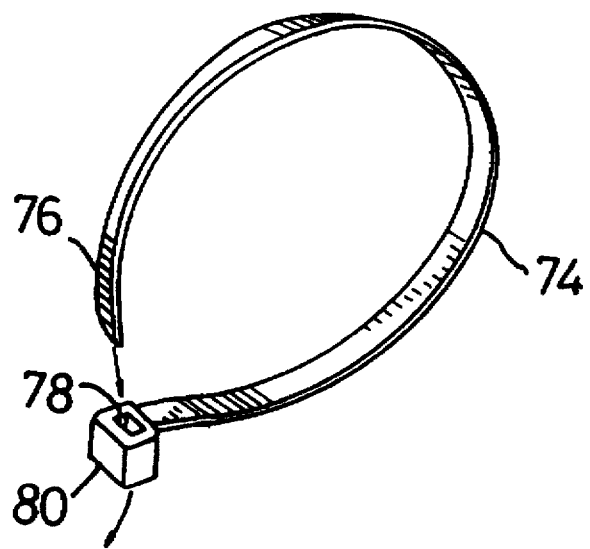
FIG. 4 is a side view of a particular embodiment of a buckle member according to the present invention.

In this embodiment, collar 46 includes free ends 68,70 which can fit around seat tube 12 in the manner shown in FIG. 1. Collar 46 is formed as one piece with top cover member 36 and front cover member 40. Forming collar 46 with free ends 68,70 allows protective cover 10 to be used on many different size seat tubes. To further facilitate coupling protective cover 10 to seat tube 12, a buckle member 74 may be fixed to free ends 68,70. Buckle member 74 may be bonded to free ends 68,70 as separate pieces, or it may encircle free ends 68,70 in the manner shown in FIG. 2. With the latter construction, buckle member 74 may comprise a well known zip tie as shown in FIG. 4 where ridges 76 on one free end of buckle member 74 engage a one-way engagement projection 78 in a locking block 80 on the other free end of buckle member 74. Such a zip tie is particularly reliable in wet and muddy conditions. In this case, protective cover 10 may be used on any bicycle, and buckle member 74 may be replaced as desired, thus eliminating the requirement of discarding the entire protective cover when the fastening mechanism wears out.

While the above is a description of various embodiments of the present invention, further modifications may be employed without departing from the spirit and scope of the present invention. For example, although top cover member 36, front cover member 40, rear cover member 44, and collar 46 can be formed as one piece, they may be coupled by adhesive or some other method. The specific shapes, sizes, and orientation of the cover members and collar may be changed depending upon the application. Openings 60,62 may be omitted, or they may be provided with covers or plugs for added protection. If desired, reinforcing strips 90 (FIG. 3) may be provided on the corners of the cover on one or both lateral edges of the cover, or they may extend along the entire lateral edge of the cover. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A protective cover (10) for a derailleur (14) comprising:
a top cover member (36) for covering a top portion of a derailleur (14);
a front cover member (40) coupled to the top cover member (36) and extending downwardly from the top cover member (36) for covering a front portion of the derailleur (14);
a rear cover member (44) coupled to the top cover member (36) and extending downwardly from the top cover member (36) for covering a rear portion of the derailleur (14);
wherein the top cover member (36), the from cover member (40), and the rear cover member (44) define an open lateral outer side, an open lateral inner side, and an open bottom side; and
a collar (46) adapted to fit on a structural member (12) for a bicycle.

2. The cover according to claim 1 wherein the top cover member (36) is formed as a generally planar member.

3. The cover according to claim 1 wherein the front cover member (44) is formed as a generally planar member which extends generally perpendicular to the top cover member (36).

4. The cover according to claim 1 wherein the rear cover member (44) is formed as a generally planar member which extends generally perpendicular to the top cover member (36).

5. The cover according to claim 1 wherein the top cover member (36), the front cover member (40), and the rear cover member (44) are each formed as a generally planar member, wherein the front cover member (40) extends generally perpendicular to the top cover (36), and wherein the rear cover member (44) extends generally perpendicular to the top cover member (36).

6. The cover according to claim 1 wherein the top cover member (36), the front cover member (40), and the rear cover member (44) are formed as one piece.

7. The cover according to claim 1 wherein the rear cover member (44) defines an opening which generally aligns with a derailleur adjustment mechanism (28,32) when the protective cover is mounted to the structural member (12).

8. The cover according to claim 1 wherein the top cover member (36) defines an opening (60,62) which generally aligns with a derailleur adjustment mechanism (28,32) when the protective cover is mounted to the structural member (12).

9. The cover according to claim 1 wherein the collar (46) is formed as one piece with the top cover member (36) and the front cover member (40).

10. The cover according to claim 1 wherein the collar (46) comprises an arcuate member connected to the top cover member (36), and wherein the collar (46) is disposed at the top cover member (36) and extends laterally inwardly from the top cover member (36).

11. The cover according to claim 10 wherein the arcuate member has first and second free ends (68,70), and further comprising a buckle member (74) fixed to the first and second free ends (68,70) for attaching the collar (46) to the structural member (12).

12. The cover according to claim 11 wherein the buckle member (74) comprises a loop member for completely encircling the structural member (12).

13. The cover according to claim 11 wherein the arcuate member is formed from a flexible material.

14. The cover according to claim 13 wherein the top cover member (36), the front cover member (40), and the rear cover member (44) are each formed from a flexible material.

15. A protective cover (10) for a derailleur (14) comprising:
a generally planar top cover member (36) for covering a top portion of a derailleur (14);
a generally planar front cover member (40) coupled to the top cover member (36) and extending downwardly from and generally perpendicular to the top cover member (36) for covering a front portion of the derailleur (14);
a generally planar rear cover member (44) coupled to the top cover member (36) and extending downwardly from and generally perpendicular to the top cover member (36) for covering a rear portion of the derailleur (14);
wherein the top cover member (36), the front cover member (40), and the rear cover member (44) define an open lateral outer side, an open lateral inner side, and an open bottom side; and
a collar (46) disposed at the top cover member (36) and adapted to fit on a structural member (12) of the bicycle.

16. The cover according to claim 15 wherein the collar (46) comprises an arcuate member connected to the top cover member (36).

17. The cover according to claim 16 wherein the arcuate member has first and second free ends (68,70), and further comprising a buckle member (74) fixed to the first and second free ends (68,70) for attaching the collar (46) to the structural member (12).

18. The cover according to claim 17 wherein the buckle member (74) comprises a loop member for completely encircling the structural member (12).

19. The cover according to claim 15 wherein the collar (46) extends laterally inwardly from the top cover member (36).

20. The cover according to claim 15 wherein the top cover member (36), the front cover member (40), and the rear cover member (44) define a completely open lateral outer side, a completely open lateral inner side, and a completely open bottom side.

* * * * *

UNITED STATES PATENT AND TRADEMARK OFFICE
CERTIFICATE OF CORRECTION

PATENT NO. : 5,676,616
DATED : October 14, 1997
INVENTOR(S) : Nobukatsu Hara

It is certified that error appears in the above-indentified patent and that said Letters Patent is hereby corrected as shown below:

```
     Claim 1, line 12 (column 3, line 60 of the patent),
"from" should read --front--.
```

Signed and Sealed this

Twentieth Day of January, 1998

Attest:

BRUCE LEHMAN

Attesting Officer

Commissioner of Patents and Trademarks